United States Patent [19]

Tsukiji et al.

[11] Patent Number: 4,664,570

[45] Date of Patent: May 12, 1987

[54] METHOD OF OPERATING A NUMERICALLY CONTROLLED MACHINE TOOL HAVING A WORKTABLE CAPABLE OF ROTATION ABOUT TWO INTERSECTING AXES

[75] Inventors: Yoshihiro Tsukiji; Haruo Maeda, both of Komatsu, Japan

[73] Assignee: Kabushiki Kaisha Komatsu Seisakusho, Tokyo, Japan

[21] Appl. No.: 751,918

[22] Filed: Jul. 5, 1985

[30] Foreign Application Priority Data

Sep. 28, 1984 [JP] Japan ................................. 59-201988

[51] Int. Cl.$^4$ ............................................. B23C 3/04
[52] U.S. Cl. ....................................... 409/84; 364/474; 409/132; 409/168; 409/224
[58] Field of Search .................... 409/80, 84, 131, 132, 409/145, 156, 159, 161, 162, 163, 164, 165, 168, 172, 174, 189, 197, 224; 364/474

[56] References Cited

U.S. PATENT DOCUMENTS 3,361,033 1/1968 Muller ................................. 409/168
3,998,127 12/1976 Romeu ............................ 409/224 X
4,036,107 7/1977 Constantine .......................... 409/80
4,149,449 4/1979 Malinowski et al. ................. 409/84
4,596,501 6/1986 Wu .................................... 409/84 X

FOREIGN PATENT DOCUMENTS

182011 10/1984 Japan ................................. 409/162
2023027 2/1979 United Kingdom .

Primary Examiner—Eugene F. Desmond
Assistant Examiner—Glenn L. Webb
Attorney, Agent, or Firm—Armstrong, Nikaido, Marmelstein & Kubovcik

[57] ABSTRACT

A method of working on a sloping surface of work is disclosed by means of a numerically controlled machine tool comprising a cutting tool carried by a spindle movable along three orthogonal axes, and a worktable rotatable both about its own axis and about another axis angularly displaced 45 degrees therefrom. The tool movements along the three axes and the worktable revolutions about the two axes are all controlled by a numerical control system, to which there are input prescribed data concerning the particular workpiece to be machined. The numerical control system is programmed to cause the machine tool to work, for example, on a conical surface or to drill one, two or more holes in preassigned positions on a sloping surface.

3 Claims, 19 Drawing Figures

METHOD OF OPERATING A NUMERICALLY CONTROLLED MACHINE TOOL HAVING A WORKTABLE CAPABLE OF ROTATION ABOUT TWO INTERSECTING AXES

BACKGROUND OF THE INVENTION

Our invention relates to methods of operation for numercally controlled machine tools, particularly for a machine tool capable of working on five different faces of a workpiece by comprising a spindle movable along three orthogonal axes and a worktable, for holding the workpiece thereon, that is revolvable both about its own axes and another axis set at 45 degrees to the horizontal.

Universal machine tools of standard construction can work on four faces of the work. By modifying such a machine tool to enable a 90 degree change in the direction of the spindle (or the tool mounted thereto) or of the work, there is obtained a more versatile machine capable of processing five different faces of the work. Two basic configurations have been suggested for such a machine tool, depending upon the arrangement of the axis about which the desired part is swiveled 90 degrees. One is of the ordinary table construction wherein the axis is parallel to either of three orthogonal axes. The other is of the tilting table construction wherein the axis is set at 45 degrees to two of the three orthogonal axes.

The ordinary table type affords greater simplicity in construction. Further, since the axis of rortation can be fixed anywhere between the extremities of its 90 degree angular displacement, the machine can not only work on five different faces but also perform the so called "grade machining", meaning that it can work on sloping surfaces. Offsetting these advantages is the greater bulk of the machine as the spindle (tool) or the work must travel a considerable distance with the 90 degree displacement of its axis of rotation.

The tilting table type machine tool is disclosed in, for example, British Patent Application No. 2,023,027 A. It offers the advantage of compact construction as the spindle (tool) or the work can rotate about its own tilting axis. This tilting axis, however, makes the construction of the machine very complex despite its compactness. An additional disadvantage is that, generally, and as in the case of the noted British patent application, the work has been allowed to take up only two predetermined positions, angularly spaced 90 degrees from each other, relative to the tool, there having been no fixed position in between. Thus the tilting table type machine has had no grade machining capability.

SUMMARY OF THE INVENTION

Our invention provides a novel operating method for a numerically controlled machine tool of the type defined whereby the work can be cut at any desired angle, and particularly into the shape of a cone, while the machine tool itself can be of compact construction.

Our invention also provides such a method whereby a hole can be formed in, and in a direction perpendicular to, a sloping surface of the work.

Our invention further provides such a method whereby two or more holes can be formed in different preassigned positions on, and in a direction perpendicular to, a sloping surface of the work.

The above and other features and advantages of our invention and the manner of realizing them will become more apparent, and the invention itself will best be understood, from a study of the following description and appended claims, with reference had to the attached drawings which all illustrate or explain the methods of our invention.

DETAILED DESCRIPTION OF THE INVENTION

Figure 1:
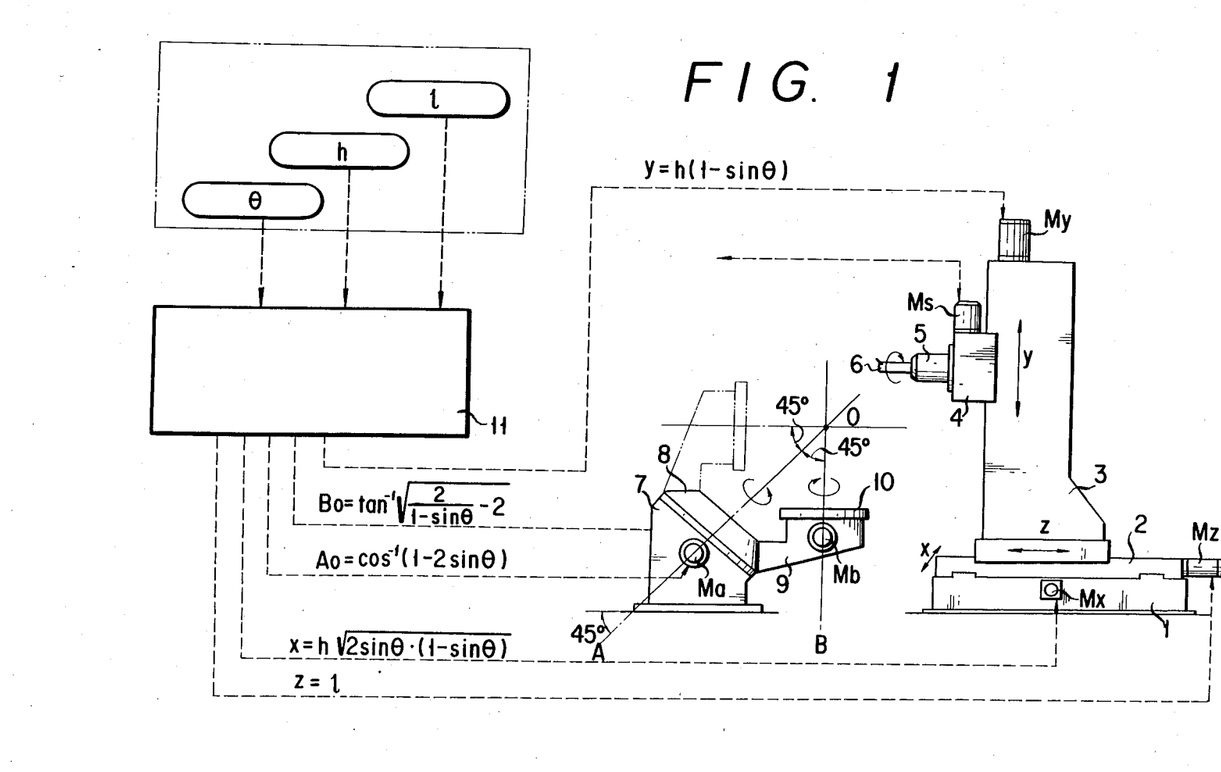
FIG. 1 is a diagrammatic side elevation of a preferred form of the numerlically controlled machine tool for use in the practice of the methods of our invention, shown together with the associated numerical control (NC) system for controlling the operation of the machine tool.

We have illustrated in FIG. 1 a typical numerically controlled machine tool for use in the practice of our machining methods. The machine tool has a tool bed 1 on which there is mounted a slide 2 for sliding motion along an x axis oriented horizontally and perpendicular to the sheet of this drawing. An x axis tool feed motor Mx is provided for such travel of the slide 2 along the x axis. A column 3 is mounted on the slide 2 for sliding motion along a z axis which also extends horizontally but at right angles with the x axis, by being driven by a z axis tool feed motor Mz. Mounted further on the column 3 is an additional slide or spindle holder 4, rotatably holding a spindle 5, which spindle holder is moved relative to the column 3 along the y axis, extending vertically and so at right angles with the x and z axes, by a y axis tool feed motor My. The spindle 5 has a cutting tool 6 of any desired variety removably mounted thereto, and projecting horizontally therefrom, in a conventional manner. At Ms is shown a tool drive motor for imparting rotation to the spindle 5 and thence to the tool 6 attached thereto. The axis of rotation of the spindle 5, and therefore of the tool 6, is parallel to the z axis.

The machine tool further comprises a table bed 7 so disposed relative to the tool bed 1 that the column 3 thereon is movable toward and away from the table bed by traveling along the z axis. The table bed 7 has a support table 8 mounted aslantly thereon for rotation about an axis A at an angle of 45 degrees to the y and z axes. A support table drive motor Ma controllably drives the support table 8. Projecting from this support table 8, a bracket 9 rotatably carries thereon a worktable 10 which rotates about an axis B at 45 degrees to the axis A. A worktable drive motor Mb is suitably coupled to the worktable 10 to cause its controlled rotation. The axis B of the worktable 10 is vertical, or parallel to the y axis when the worktable is in the horizontal position indicated by the solid lines in FIG. 1, and is horizontal, or parallel to the z axis, when the worktable is in the vertical position indicated by the dashed lines.

At 11 is shown an N/C system or "director" having outputs coupled to the x axis tool feed motor Mx, z axis tool feed motor Mz, y axis tool feed motor My, tool drive motor Ms, support table drive motor Ma, and worktable drive motor Mb. For machining work by this machine tool in accordance with the methods of our invention, the following data must be input to the N/C system 11 in numerically coded form:

1. The angle $\theta$ of the sloping surface, to be machined, of the work (not shown in FIG. 1) on the worktable 10 with respect to the axis B.

2. The distance h between the intersection O of the support table axis A and worktable axis B and the intersection of the axis of rotation of the spindle 5 (and hence of the cutting tool 6 mounted thereto) and the axis B when the tool is held in position against, and perpendicular to, the sloping surface of the work on the worktable 10.

3. The distance l between the sloping work surface and a plane laid parallel to the sloping work surface and containing the intersection O of the axes A and B.

The above listed factors $\theta$, h and l are of course subject to change depending upon the particular machining operation to be performed. The N/C system 11 reads such coded information and converts it into machine tool instructions for individually controlling the above noted motors Mx, Mz, My, Ms, Ma and Mb as dictated by the methods of our invention.

Figure 2:
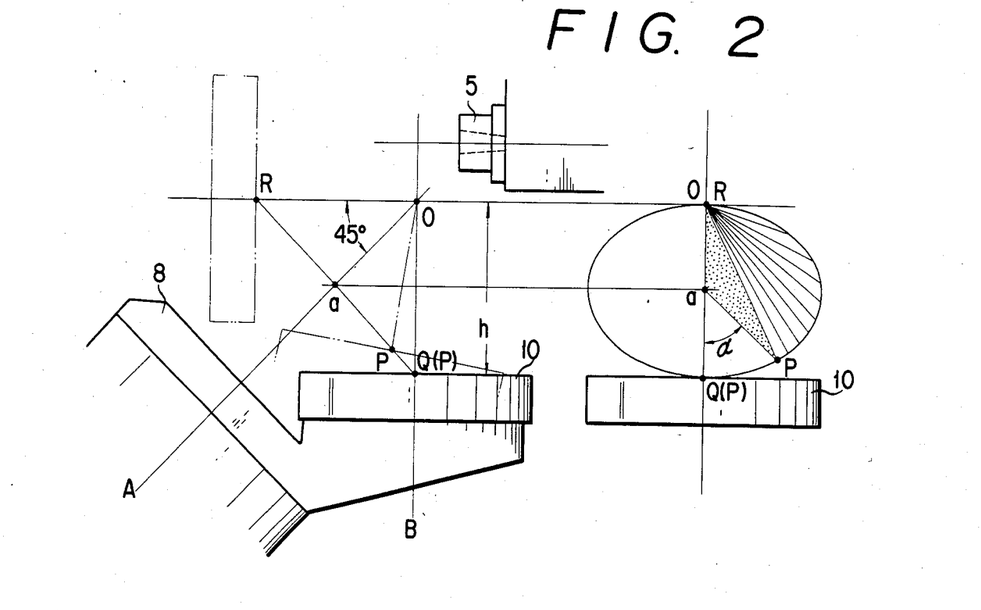
FIGS. 2 through 8 are diagrams for use in the analytical study of the operation of the machine tool of FIG. 1 in accordance with the methods of our invention.

As illustrated in FIG. 2, we will use the following additional symbols in the subsequent discussion of our machining methods:

P = the geometrical center of the top surface of the worktable 10;
Q = the position of the worktable center P when its axis B is perpendicular to the plane of the horizon as indicated by the solid lines in FIG. 1 or 2; and
R = the position of the worktable center P when the worktable 10 is revolved with the support table 8 through 180 degrees about the axis A from its solid line position to the phantom position of FIGS. 1 and 2.

Assume that $\overline{OP}$ is the above defined distance h, as indicated in FIG. 2. It will be seen that, during the rotation of the support table 8 about the axis A, the center P of the worktable 10 travels circumferentially of the bottom circle of an imaginary cone having a radius vector $\overline{OP}$, a vertex at the point O, and a vertex angle of 90 degrees. Let a be the center of the bottom circle of the cone. Then the rotation of the support table 8 about the axis A is equivalent to the rotation of the radius vector $\overline{aP}$ about the axis A.

Figure 3:
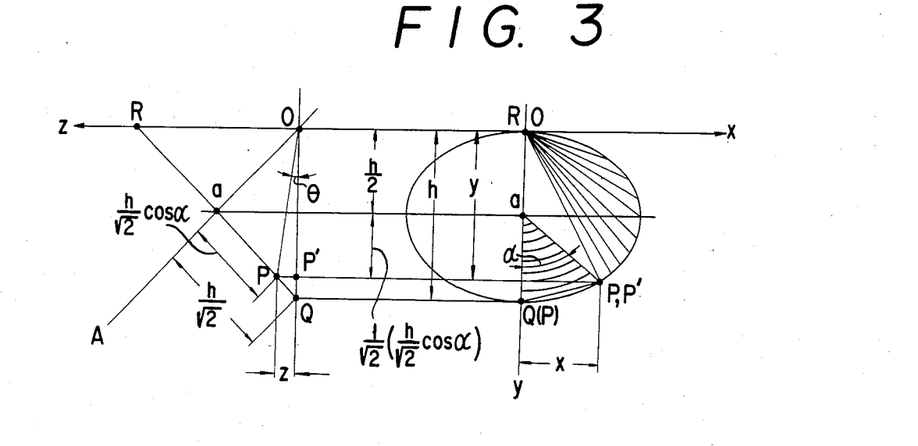
Figure 4:
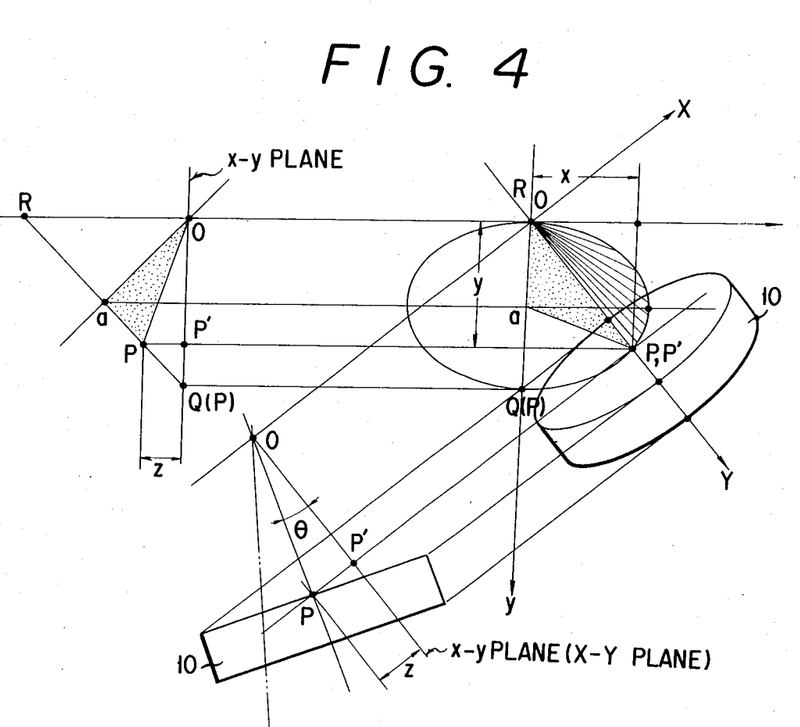

Let us suppose a system of the coordinate axes x, y and z that are fixed in space. With this coordinate system in use, and with reference directed to FIGS. 3 and 4, we will locate the center P of the worktable 10, P(x, y, z), when the support table 8 is turned an angle $\alpha$ about the axis A. If a perpendicular from the point P to the x-y plane passing the intersection O (reference plane) cuts this reference plane at P', then the point P' can be expressed as P'(x, y, O). The x, y and z can be defined as:

$$x = \overline{aP} \sin \alpha = \frac{h}{\sqrt{2}} \sin \alpha \quad (1)$$

$$y = \frac{h}{2} + \frac{1}{\sqrt{2}} \left( \frac{h}{\sqrt{2}} \cos \alpha \right) = \frac{h}{2}(1 + \cos \alpha) \quad (2)$$

$$z = \frac{1}{\sqrt{2}} \left( \frac{h}{\sqrt{2}} - \frac{h}{\sqrt{2}} \cos \alpha \right) = \frac{h}{2}(1 - \cos \alpha) \quad (3)$$

If then $\overline{OP}$ is at an angle $\theta$ to the reference plane, then from the triangle OPP' (real angle $\theta$), $$\sin \theta = \frac{z}{\overline{OP}} = \frac{h}{2}(1 - \cos \alpha)/h = \frac{1}{2}(1 - \cos \alpha) \quad (4)$$

$$\therefore \cos \alpha = 1 - 2 \sin \theta \quad (4')$$

$$\alpha = \cos^{-1}(1 - 2 \sin \theta) \quad (5)$$

Thus, when the support table 8 is revolved the angle $\alpha$ about the axis A, the center of the worktable 10 comes to the point P(x, y, z) represented by Equations (1), (2) and (3), and $\overline{OP}$ is at the angle $\theta$ to the reference plane. Accordingly, if the worktable 10 has mounted thereon a cone shaped workpiece having a vertex at the origin O and having a vertex angle of $2\theta$, the conical surface of this workpiece will be contiguous to the x-y plane along the $\overline{OP'}$. Suppose another rectangular coordinate system having a Y axis along the $\overline{OP'}$ and an X axis at right angles therewith as in FIG. 4. It will be seen that the conical surface of this workpiece having the vertex angle of $2\theta$ can be cut by moving the tip of the tool 6 on the spindle 5 along the $\overline{OP'}$. The point P' can thus be written as P'(x, y, O), which is defined as $$x = (h/\sqrt{2}) \sin \alpha \quad (1)$$

$$y = (h/2)(1 + \cos \alpha) \quad (2)$$

$$z = 0. \quad (3)$$

Figure 5:
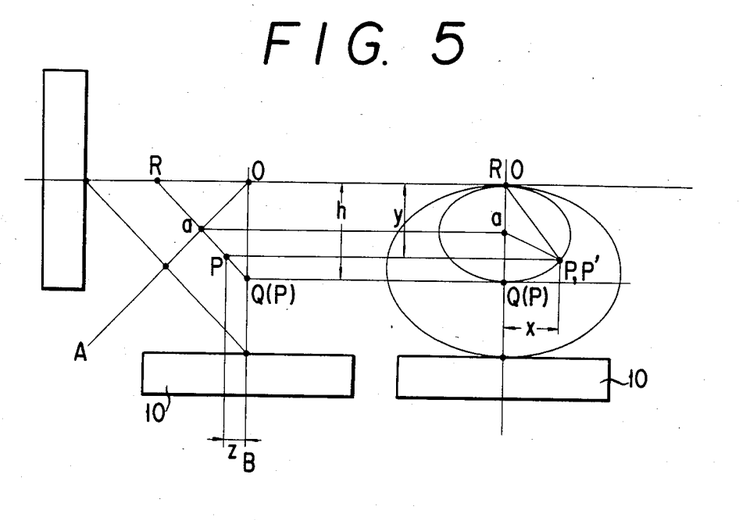

We have previously assumed the h to be the distance between O and P and also the point P to be the center of the top surface of the worktable 10. However, the above findings all hold true if the point P is anywhere on the axis B about which the worktable 10 rotates, as illustrated in FIG. 5.

Figure 6:
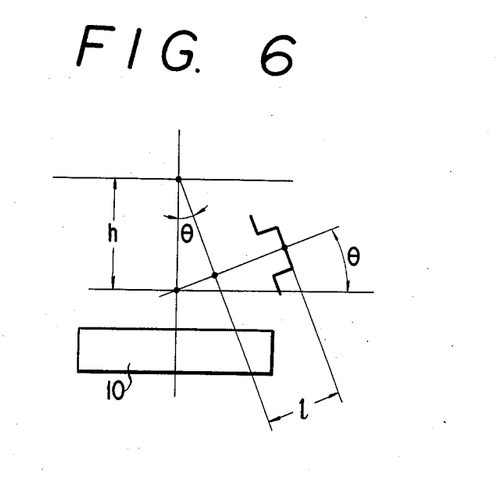

Further, as will be seen from FIG. 6, the machine tool of FIG. 1 can be used as above not only for cutting the conical surface having the vertex angle of $2\theta$ but also for machining a sloping surface displaced a distance l along the z axis. The tool 6 may then be retracted the distance l along the z axis from the x-y plane.

Figure 7:
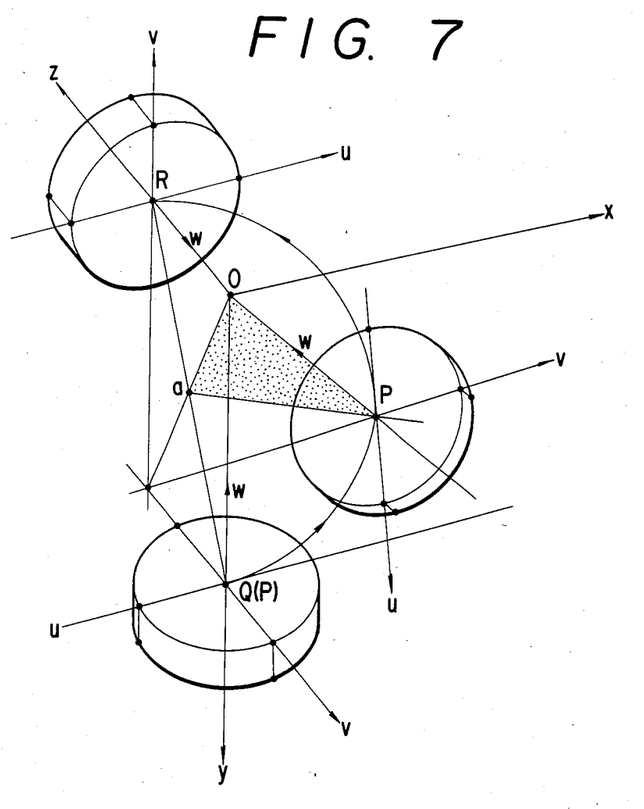

Let us now proceed to a study of rotation about the axis B in order to enable the machine tool of FIG. 1 to work on a planar sloping surface of a workpiece on the worktable 10. FIG. 7 illustrates the movement of a system of coordinates u, v and w fixed on the worktable 10 when the support table 8 is revolved 180 degrees about the axis A to bring the center point P of the worktable 10 from Q to R, with the worktable locked against rotation about its axis B. The coordinate axes u and v are both parallel to the plane of the worktable 10, intersecting each other at its center point P, and the coordinate axis w is normal to the plane of the worktable. Suppose that the worktable 10 is revolved about the axis A as above withe the point P maintained in contact with the tip of the spindle 5. The problem now is how the projection of the spindle axis, which is parallel to the z axis, on the u-v plane revolves on that plane. A study of the revolution of the worktable center point P from Q to R, with the z axis fixed, is equivalent to a study of the revolution of the z axis, with the coordiate axes u, v and w fixed, that is, to a study of the movement of the spindle 5 relative to the worktable 10, or of the movement of the z axis relative to the system of coordiates u, v and w.

Figure 8:
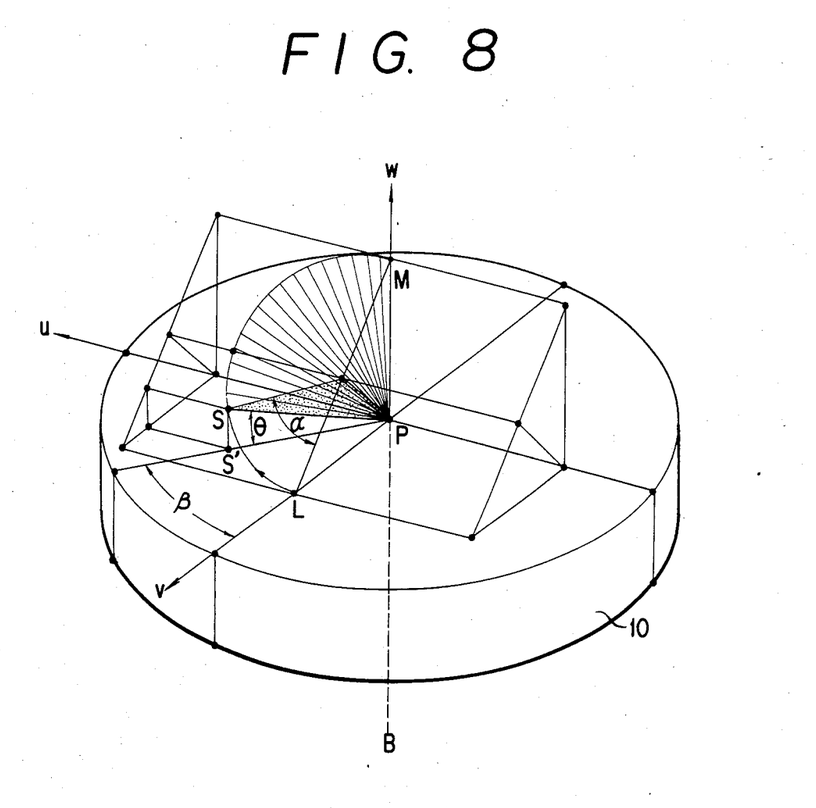

Accordingly, it can be seen from FIG. 8 that the spindle axis parallel to the z axis has a radius vector $\overline{PS}$, and the S travels from L to M; that is, it travels on the conical surface having a vertex at P and a vertex angle of 90 degrees, with a radius vector $\overline{PL}$. Let S' be the projection of the S on the u-v plane, and $<LSP'=\beta$, then this angle $\beta$ is what we have been seeking. It is insufficient for working on the desired planar sloping surface of the work to revolve the support table 8 through the angle $\alpha$ about the axis A and to position the tool 6 with respect to the new system of coordinates X and Y, because then the worktable 10 has been revolved through the angle $\beta$.

This deficiency can of course be remedied by revolving the worktable 10 through the required angle $\beta$. This angle, being obtainable from the projection of the 90 degrees cone on the u-v plane, is $<QOP'$ in FIG. 4 and is equal to the angle between the system of coordinates x and y and the system of coordinates X and Y. Therefore $$\tan \beta = \frac{x}{y} = \frac{h \sin \alpha}{\sqrt{2}} \cdot \frac{2}{h(1 + \cos \alpha)} = \frac{\sqrt{2} \sin \alpha}{1 + \cos \alpha} \quad (7)$$

We have now obtained all the information for grade cutting by the machine tool of FIG. 1, namely, Equations (1), (2), (3), (4) and (7). For rewriting these equations in terms of $\theta$, the equation $$\cos \alpha = 1 - 2 \sin \theta$$

may be substituted in the identical equation $$\sin \alpha = \sqrt{1 - \cos^2 \alpha}$$

as follows:

$$\sin \alpha = \sqrt{1 - (1 - 2 \sin \theta)^2} \quad (8)$$
$$= \sqrt{1 - (1 - 4 \sin \theta + 4 \sin^2 \theta)}$$
$$= 2 \sqrt{\sin \theta (1 - \sin \theta)} .$$

Substituting Equations (4') and (8) in Equations (1), (2), (3) and (7), $$x = \frac{h}{\sqrt{2}} \sin \alpha = \sqrt{2} \cdot h \sqrt{\sin \theta (1 - \sin \theta)} \quad (9)$$

$$x = h \sqrt{2 \sin \theta (1 - \sin \theta)}$$

$$y = \frac{h}{2}(1 + \cos \alpha) = \frac{h}{2}(1 + 1 - 2 \sin \theta) \quad (10)$$
$$= h(1 - \sin \theta)$$

$$z = \frac{h}{2}(1 - \cos \alpha) = \frac{h}{2}(1 - 1 + 2 \sin \theta) \quad (11)$$
$$= h \sin \theta$$

$$\tan \beta = \frac{x}{y} = \frac{\sqrt{2 \sin \theta (1 - \sin \theta)}}{1 - \sin \theta} = \sqrt{\frac{2 \sin \theta}{1 - \sin \theta}} \quad (12)$$
$$= \sqrt{\frac{2 - (2 - 2 \sin \theta)}{1 - \sin \theta}} = \sqrt{\frac{2}{1 - \sin \theta} - 2}$$

$$\beta = \tan^{-1} \sqrt{\frac{2}{1 - \sin \theta} - 2}$$

Equation (5) needs no rewriting. Hence $$\alpha = \cos^{-1}(1 - 2 \sin \theta) \quad (5)$$

Figure 9:
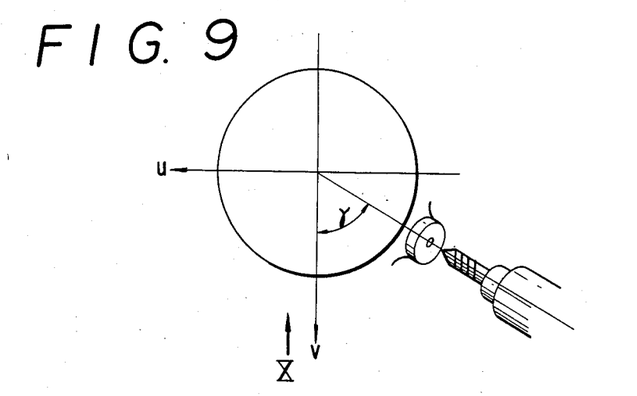
FIG. 9 is a diagrammatic illustration of how a hole is cut in a workpiece by the machine tool of FIG. 1 in accordance with the method of our invention.
Figure 10:
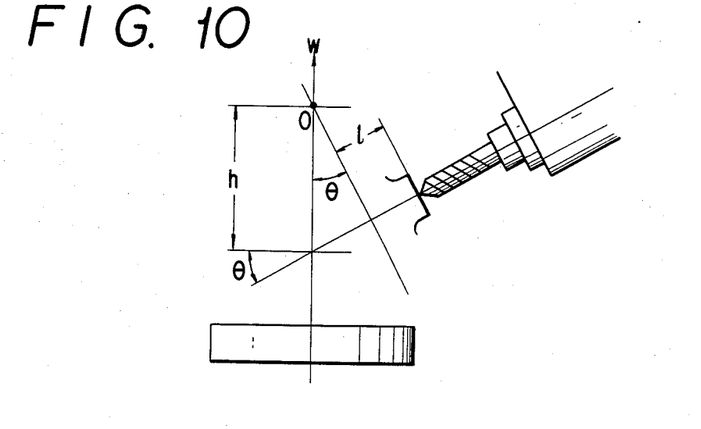
FIG. 10 is a similar illustration as seen in the direction of the arrow X in FIG. 9.
Figure 11:
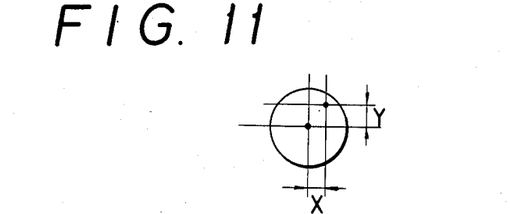
FIG. 11 is a diagrammatic illustration of the positional relationship between holes to be drilled in a workpiece in accordance with the method of our invention.

The foregoing considerations can be pictorially summarized as in FIGS. 9 through 11. The following displacements of the support table 8, worktable 10, and tool 6 are required for creating a bore in a sloping planar surface of the work, in a direction normal to that surface, as illustrated in FIGS. 9 through 11:

The angle of rotation of the support table 8:

$$A_o = \alpha = \cos^{-1}(1 - 2 \sin \theta).$$

The angle of rotoation of the worktable 10:

$$B_o = \beta + \gamma = \tan^{-1} \sqrt{\frac{2}{1 - \sin \theta} - 2} + \gamma.$$

Tool displacement along the x axis:

$$x = h \sqrt{2 \sin \theta (1 - \sin \theta)} .$$

Tool displacement along the y axis:

$$y = h(1 - \sin \theta).$$

Tool displacement along the z axis:

$$z = 1.$$

We will now proceed to the discussion, with reference directed to FIGS. 12 through 16, of how to create two holes 13 and 14 in predetermined different positions in, and in a direction perpendicular to, the inclined surface, at the angle θ to the axis B, of a workpiece 12 on the worktable 10. For boring the first hole 13 the required factors θ, h, 1 and r may be determined and input to the N/C system 11 of FIG. 1. This N/C system is programmed to position the support table 8 at $$Ao = \cos^{-1}(1 - 2 \sin \theta),$$

to position the worktable 10 at $$B_o = \tan^{-1} \sqrt{\frac{2}{1 - \sin \theta} - 2} + \gamma,$$

and to position the tip of the tool 6 at $$x = h \sqrt{2 \sin \theta (1 - \sin \theta)},$$

$$y = h (1 - \sin \theta),$$

$$z = 1.$$

The first hole 13 can be formed as the tool 6 is subsequently fed forwardly along the z axis.

Figures 12, 15, 16:
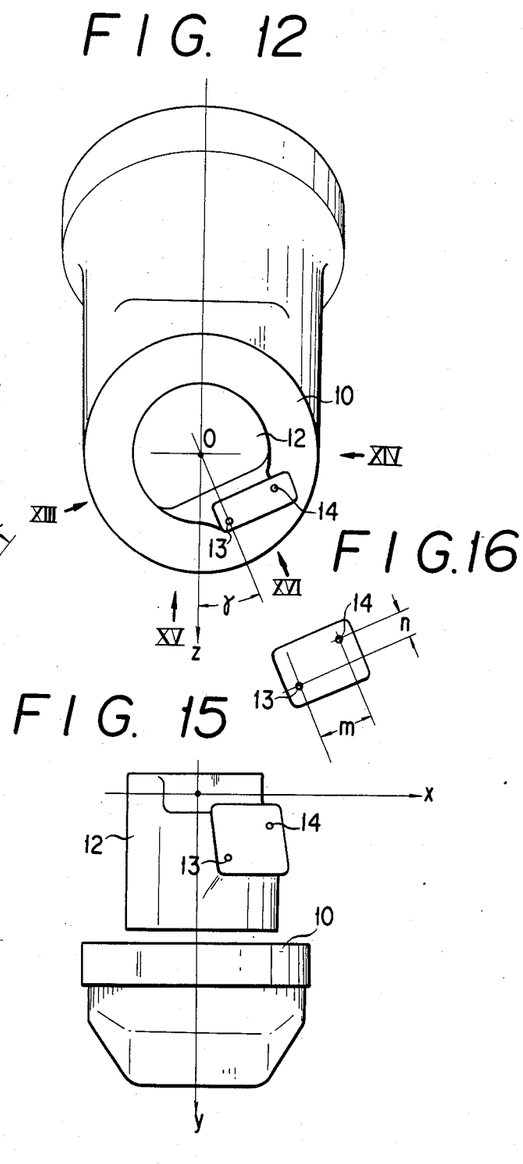
FIG. 12 is a plan view of a an example of workpiece to be machined in accordance with the method of our invention.
FIG. 15 is also a similar illustration of the workpiece and the worktable as seen in the direction of the arrow XV in FIG. 12.
FIG. 16 is an enlarged representation of part of the workpiece of FIG. 12 as seen in the direction of the arrow XVI in that figure.
Figure 13:
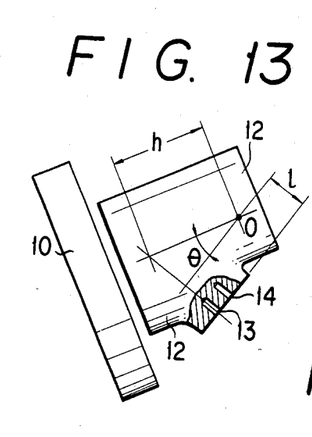
FIG. 13 is an elevation, shown on a reduced scale and partly sectioned for clarity, of the workpiece of FIG. 12, as well as of the worktable on which it is mounted, as seen in the direction of the arrow XIII in FIG. 12.
Figure 14:
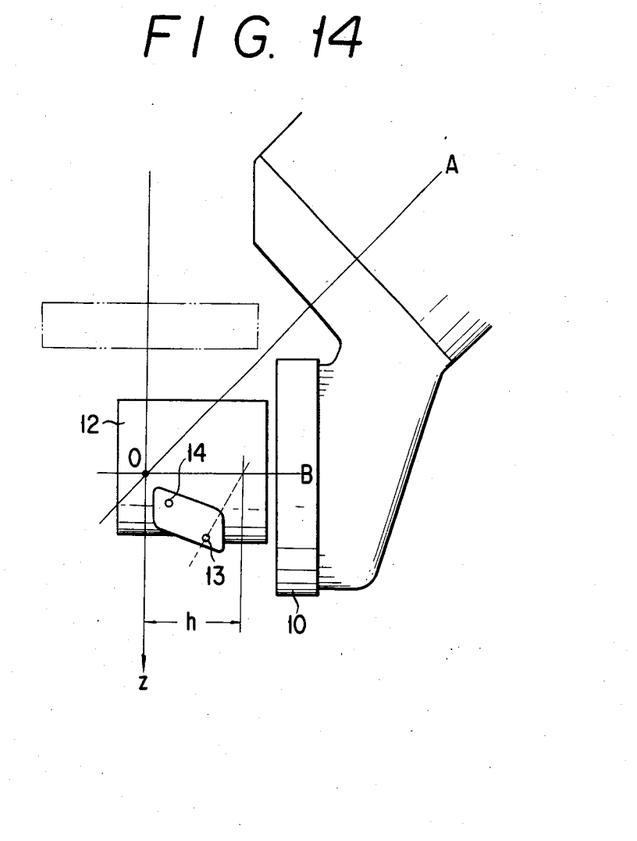
FIG. 14 is a similar illustration of the workpiece and the worktable as seen in the direction of the arrow XIV in FIG. 12.
Figure 17:
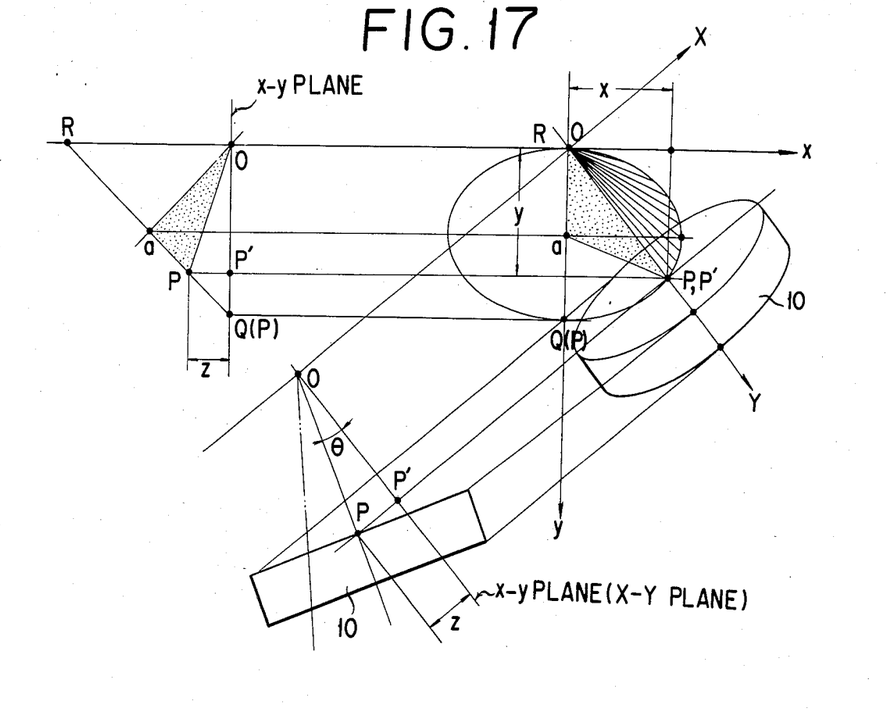
FIG. 17 is a diagram for use in the analytical study of the operation of the machine tool of FIG. 1 in creating the two holes in the workpiece as in FIGS. 12 through 16 in accordance with the method of our invention.

For the creation of the second hole 14 the positional relationship (m, n), FIG. 16, of this hole to the first hole 13 must be known and have been input to the N/C system 11. The N/C system is programmed to shift the tip of the tool to a position displaced the distance m along the X axis and the distance n along the Y axis from the position (x, y), the X and Y axes constituting a coordinate system that is, as illustrated in FIG. 17, at an angle of $$\beta = \tan^{-1} \sqrt{\frac{2}{1 - \sin \theta} - 2}$$

to the x and y coordinate system. The second hole 14 can be cut as the tool 6 is subsequently fed forwardly along the z axis. A like procedure may be followed for the creation of three or more holes.

Thus, according to one aspect of our invention, there is provided a method of operation for a numerically controlled machine tool constructed substantially as illustrated in FIG. 1, which method comprises inputting into the N/C system 11 coded data concerning the angle θ of a desired surface to be machined of a workpiece on the worktable relative to the axis B, the distance h between the intersection O of the axes A and B and the intersection of the axis B with the axis of rotation of the tool held in position against and perpendicular to the desired surface of the workpiece, and the distance 1 between the desired surface of the workpiece and a plane laid parallel to the desired surface of the workpiece and passing the intersection O of the axes A and B, programming the N/C system to put out instructions for revolving the worktable about the axis A through an angle defined as $$Ao = \cos^{-1}(1 - 2 \sin \theta)$$

and for positioning the tool at a point given by $$\underline{x} = \underline{h} \sqrt{2 \sin \theta (1 - \sin \theta)},$$

$$\underline{y} = \underline{h} (1 - \sin \theta), \text{ and}$$

$$\underline{z} = \underline{1},$$

and machining the workpiece on the worktable. A conical surface of the workpiece may thus be machined.

According to another aspect of our invention, the N/C system 11 is further programmed for imparting corrective revolution to the worktable about the axis B through an angle defined as $$B_o = \tan^{-1} \sqrt{\frac{2}{1 - \sin \theta} - 2}.$$

Figure 18:
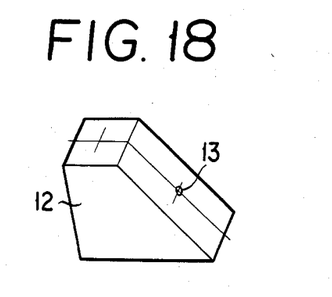
FIG. 18 is a perspective view of a further example of a workpiece that can be machined in accordance with the method of our invention.

A bore may thus be drilled in a predetermined position in, and in a direction perpendicular to, a planar sloping surface of the workpiece, as illustrated in FIG. 18.

Figure 19:
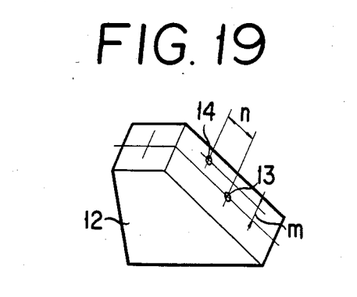
FIG. 19 is a perspective view of a still further example of a workpiece that can be machined in accordance with the method of our invention.

According to still another aspect of our invention, there is provided a method of creating holes in at least two predetermined different positions on, and in a direction perpendicular to, a sloping surface of a workpiece, as illustrated by way of example in FIG. 19, by the numerically controlled machine tool constructed substantially as in FIG. 1. The method comprises inputting into the N/C system 11 coded data concerning the angle θ of the sloping surface of the workpiece on the worktable relative to the axis B, the distance h between the intersection O of the axes A and B and the intersection of the axis B with the axis of rotation of the tool being held perpendicular to the sloping surface of the workpiece in one predetermined position thereon where the first hole is to be formed, the distance 1 between the sloping surface of the workpiece and a plane laid parallel to the sloping surface of the workpiece and passing the intersection O of the axes A and B, and the positional relationship (m, n) between the two predetermined positions on the sloping surface of the workpiece where the holes are to be formed, programming the N/C system to put out instructions for revolving the worktable about the axis A through an angle defined as $$Ao = \cos^{-1}(1 - 2 \sin \theta)$$

and for positioning the tool at a point given by $$\underline{x} = \underline{h} \sqrt{2 \sin \theta (1 - \sin \theta)},$$

$$\underline{y} = \underline{h} (1 - \sin \theta), \text{ and}$$

$$\underline{z} = \underline{1},$$

machining the first hole in one predetermined position in the sloping surface of the workpiece, further programming the numerical control means for positioning the tool at another point displaced m and n along X and Y axes from the point (x, y), the X and Y axes constituting a coordinate system at an angle $$B_o = \tan^{-1} \sqrt{\frac{2}{1 - \sin \theta} - 2}$$

with respect to a coordinate system of the axes x and y, and machining the second hole in the sloping surface of the workpiece.

What we claim is:

1. A method of operation for a numerically controlled machine tool of the kind having a tool mounted to a spindle for movement therewith along an x axis extending horizontally, a y axis extending vertically, and a z axis extending horizontally and at right angles with the x axis, the tool being rotatable with the spindle about an axis parallel to the z axis, a worktable disposed forwardly of the tool in the direction of the z axis and revolvable both about a fixed axis A set at 45 degrees with respect to the horizontal in the z-y plane and about its own axis B set at 45 degrees with respect to the axis A in the same plane, and numerical control means for controlling the movement of the tool along the x, y and z axes and for controlling the rotation of the worktable about the axes A and B, which method of operation comprises the steps of:

inputting into the numerical control means coded data concerning the angle $\theta$ of a desired surface to be machined of a workpiece on the worktable relative to the axis B, the distance h between the intersection O of the axes A and B and the intersection of the axis B with the axis of rotation of the tool held in postion against and perpendicular to the desired surface of the workpiece, and the distance l between the desired surface of the workpiece and a plane parallel to the desired surface of the workpiece and passing through the intersection O of the axes A and B, programming the numerical control means to put out instructions for rotating the worktable about the axis A through an angle defined as $Ao = \cos^{-1} (1 - 2 \sin \theta)$ and for positioning the tool at a point given by $\underline{x} = \underline{h} \sqrt{2 \sin \theta (1 - \sin \theta)}$ , $\underline{y} = \underline{h} (1 - \sin \theta)$, and $\underline{z} = \underline{l}$, and machining the workpiece on the worktable.

2. The method of machine tool operation as set forth in claim 1, wherein the method includes the further step of programming the numerical control means for imparting corrective rotation to the worktable about the axis B through an angle defined as $$B_o = \tan^{-1} \sqrt{\frac{2}{1 - \sin \theta} - 2}.$$

3. In a numerically controlled machine tool of the kind having a tool mounted to a spindle for movement therewith along an x axis extending horizontally, a y axis extending vertically, and a z axis extending horizontaly and at right angles with the x axis, the tool being rotatable with the spindle about an axis parrel to the z axis, a worktable disposed forwardly of the tool in the direction of the z axis and revolvable both about a fixed axis A set at 45 degrees with respect to the horizontal in the z-y plane and about its own axis B set at 45 degrees with respect to the axis A in the same plane, and numerical control means for controlling the movement of the tool along the x, y and x axes and for controlling the rotation of the worktable about the axes A and B, a method of creating holes in two predetermined different positions on, and in a direction perpendicular to, a sloping surface of a workpiece on the worktable, which method comprises the steps of:

inputting into the numerical control means coded data concerning the angle $\theta$ of the sloping surface of the workpiece on the worktable relative to the axis B, the distance h between the intersection O of the axes A and B and the intersection of the axis B with the axis of rotation of the tool being held perpendicular to the sloping surface of the workpiece in one predetermined position thereon where the first hole is to be formed, the distance l between the sloping surface of the workpiece and a plane parallel to the sloping surface of the workpiece and passing through the intersection O of the axes A and B, and the positional relationship (m, n) between the two predetermined positions on the sloping surface of the workpiece where the holes are to be formed, programming the numerical control means to put out instructions for rotating the worktable about the axis A through an angle defined as $Ao = \cos^{-1} (1 - 2 \sin \theta)$ and for positioning the tool at a point given by $\underline{x} = \underline{h} \sqrt{2 \sin \theta (1 - \sin \theta)}$ , $\underline{y} = \underline{h} (1 - \sin \theta)$, and $\underline{z} = \underline{l}$, machining the first hole in one predetermined position in the sloping surface of the workpiece, further programming the numerical control means for positioning the tool at another point displaced m and n along X and Y axes from the point (x, y), the X and Y axes constituting a coordinate system at an angle $$B_o = \tan^{-1} \sqrt{\frac{2}{1 - \sin \theta} - 2}$$

with respect to a coordinate system of the axes x and y, and machining the second hole in the sloping surface of the workpiece.

* * * * *